United States Patent
Sato (10) Patent No.: US 9,684,013 B2
(45) Date of Patent: Jun. 20, 2017

(54) MOTION DETECTING DEVICE, PORTABLE TERMINAL DEVICE AND MOTION DETECTING METHOD

(71) Applicant: LAPIS SEMICONDUCTOR CO., LTD., Kanagawa (JP)

(72) Inventor: Junpei Sato, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 67 days.

(21) Appl. No.: 14/665,190

(22) Filed: Mar. 23, 2015

(65) Prior Publication Data

US 2015/0276792 A1    Oct. 1, 2015

(30) Foreign Application Priority Data

Mar. 27, 2014   (JP) .................................. 2014-066661

(51) Int. Cl.

| | | |
|---|---|---|
| *G01P 15/18* | (2013.01) | |
| *G01P 13/00* | (2006.01) | |
| *G06F 1/16* | (2006.01) | |
| *G06F 3/01* | (2006.01) | |
| *G06F 3/038* | (2013.01) | |

(52) U.S. Cl.
CPC ............ *G01P 15/18* (2013.01); *G01P 13/00* (2013.01); *G06F 1/1626* (2013.01); *G06F 1/1694* (2013.01); *G06F 3/011* (2013.01); *G06F 3/017* (2013.01); *G06F 3/038* (2013.01); *G06F 2200/1637* (2013.01)

(58) Field of Classification Search
CPC ........ G01P 13/00; G01P 15/18; G06F 1/1626; G06F 1/1694; G06F 2200/1637; G06F 3/011; G06F 3/017; G06F 3/038
See application file for complete search history.

(56) References Cited

U.S. PATENT DOCUMENTS

| | | | |
|---|---|---|---|
| 8,942,950 B2 | 1/2015 | Fujiwara | |
| 2006/0116848 A1* | 6/2006 | Clifford | G01P 15/0891 |
| | | | 702/141 |
| 2010/0088061 A1* | 4/2010 | Horodezky | G06F 1/1624 |
| | | | 702/141 |
| 2011/0054831 A1* | 3/2011 | Fujiwara | G06F 3/017 |
| | | | 702/141 |
| 2012/0032894 A1* | 2/2012 | Parivar | G06F 1/3215 |
| | | | 345/173 |

FOREIGN PATENT DOCUMENTS

| | | |
|---|---|---|
| JP | 2012-098254 A | 5/2012 |
| JP | A2012529253 | 11/2012 |

* cited by examiner

*Primary Examiner* — Kenneth Bukowski
(74) *Attorney, Agent, or Firm* — Volentine & Whitt, PLLC (57) ABSTRACT

A motion detecting device has: an input section to which acceleration signals, that express accelerations of respective axes of three axes of a three-dimensional orthogonal coordinate system, are respectively inputted; and a motion detecting section that sets each of plural axes, that include two different axes that are selected from among the three axes, as a designated axis in a predetermined order, and outputs a motion detection signal if it is judged that directions of motion, that are detected on the basis of the acceleration signals of the respective axes that were inputted to the input section, are directions of respective designated axes that have been set.

8 Claims, 11 Drawing Sheets

FIG.11

MOTION DETECTING DEVICE, PORTABLE TERMINAL DEVICE AND MOTION DETECTING METHOD

CROSS-REFERENCE TO RELATED APPLICATION

This application claims priority under 35 USC 119 from Japanese Patent Application No. 2014-066661 filed on Mar. 27, 2014, the disclosure of which is incorporated by reference herein.

BACKGROUND OF THE INVENTION

Field of the Invention

The present invention relates to a motion detecting device, a portable terminal device, and a motion detecting method.

Description of the Related Art

There have been proposed portable terminal devices such as cell phones, smart phones and the like that have a motion detecting device that recognizes motion on the basis of acceleration signals that are outputted from an acceleration sensor (see, for example, Japanese National Publication No. 2012-529253 and Japanese Patent Application Laid-Open (JP-A) No. 2012-98254).

The motion detecting device disclosed in JP-A No. 2012-98254 separates each acceleration component data, that is outputted from a triaxial acceleration sensor, into a static component that is obtained by carrying out low-pass filter processing, and a motion component that is obtained by subtracting the static component from the acceleration component data. This motion detecting device judges that the axis, at which the static component is a maximum, is the gravity axis. If the axis, that corresponds to the motion component that exhibits the maximum value, is an axis other than the gravity axis, the motion detecting device judges, on the basis of the motion component that exhibits the maximum value, along which axial direction the device has moved. In accordance with this motion detecting device, erroneous judgment that is caused by unintended vibrations in the direction of gravity that arise easily at the times of walking, at times of running, and the like can be reduced.

SUMMARY OF THE INVENTION

The present invention has been made in view of the above circumstances and provides a motion detecting device, a portable terminal device, and a motion detecting method.

According to a first aspect of the present invention, there is provided a motion detecting device including: an input section to which acceleration signals, that express accelerations of respective axes of three axes of a three-dimensional orthogonal coordinate system, are respectively inputted; and a motion detecting section that sets each of plural axes, that include two different axes that are selected from among the three axes, as a designated axis in a predetermined order, and outputs a motion detection signal if it is judged that directions of motion, that are detected on the basis of the acceleration signals of the respective axes that were inputted to the input section, are directions of respective designated axes that have been set.

According to a second aspect of the present invention, there is provided a portable terminal device comprising: the motion detecting device of the first aspect; an acceleration sensor that inputs the respective acceleration signals to the input section; and a control section that carries out a predetermined operation in accordance with the motion detection signal.

According to a third aspect of the present invention, there is provided a motion detecting method including: setting each of plural axes, that are selected from among three axes of a three-dimensional orthogonal coordinate system, as a designated axis in a predetermined order; and outputting a motion detection signal if it is judged that directions of motion, that are detected on the basis of received acceleration signals that express accelerations of the respective axes of the three axes, are directions of respective designated axes that have been set.

BRIEF DESCRIPTION OF THE DRAWINGS

Preferred embodiments of the present invention will be described in detail based on the following figures, wherein.

DETAILED DESCRIPTION OF THE INVENTION

Embodiments of the present invention are described hereinafter with reference to the drawings. Note that the same or corresponding structural elements are denoted by the same reference numerals in the respective drawings.

First Embodiment

Figure 1:
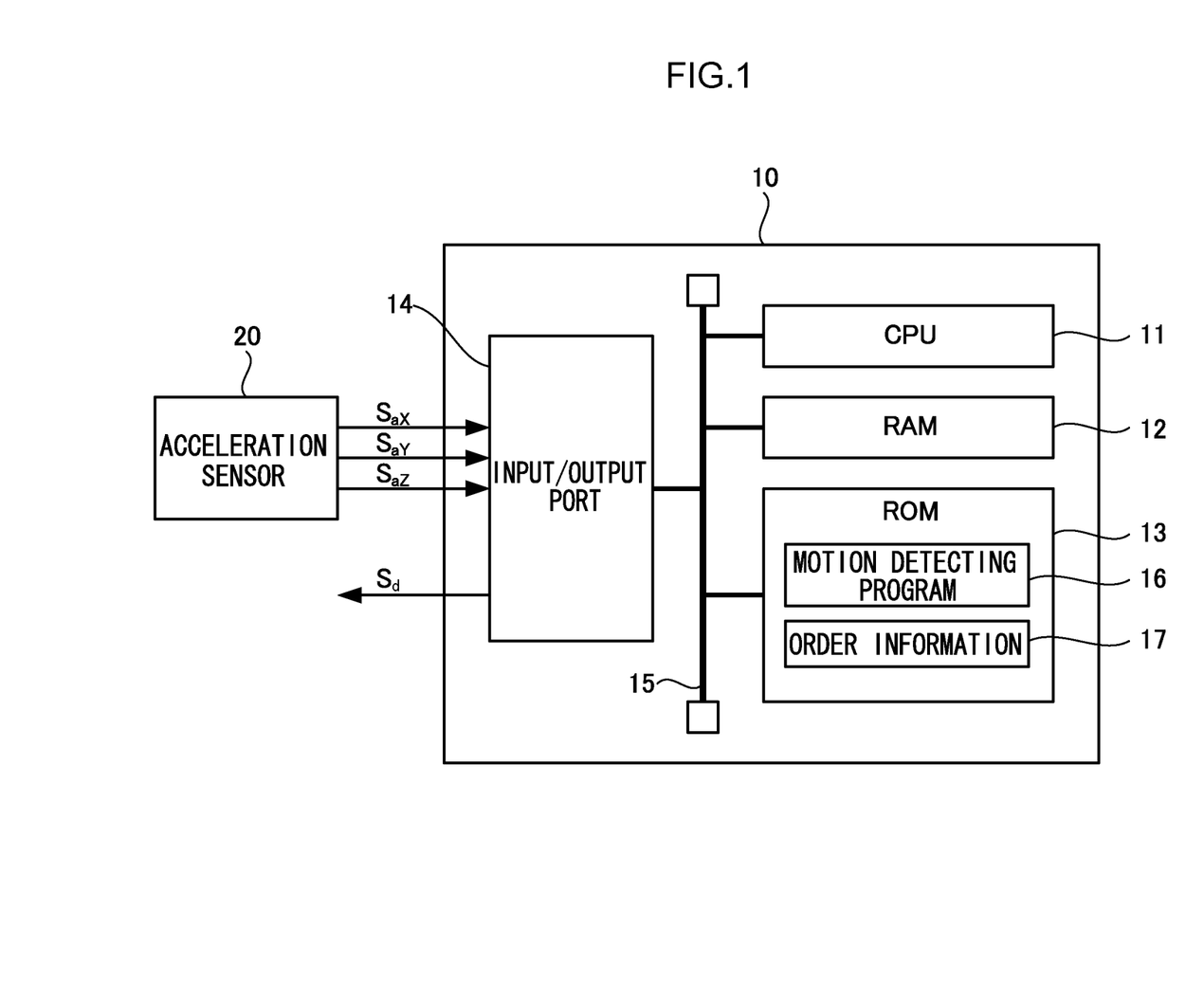
FIG. 1 is a block drawing showing the structure of a motion detecting device relating to an embodiment of the present invention.

FIG. 1 is a block drawing showing the structure of a motion detecting device 10 relating to an embodiment of the present invention. An acceleration sensor 20 that is used together with the motion detecting device 10 is also shown in FIG. 1.

The acceleration sensor 20 detects the accelerations that arise in the directions of respective axes that are the X-axis, the Y-axis and the Z-axis of a three-dimensional orthogonal coordinate system, and outputs, per axis, an acceleration signal that corresponds to the magnitude of the detected acceleration. Namely, the acceleration sensor 20 outputs acceleration signal $S_{aX}$ that expresses the magnitude of the acceleration on the X-axis, acceleration signal $S_{aY}$ that expresses the magnitude of the acceleration on the Y-axis, and $S_{aZ}$ that expresses the magnitude of the acceleration on the Z-axis. The acceleration sensor 20 may be a triaxial acceleration sensor that, by a single device, detects the accelerations on the X-axis, the Y-axis and the Z-axis. Or, the acceleration sensor 20 may be structured by a different device per axis.

The motion detecting device 10 is a microcomputer that includes a CPU (Central Processing Unit) 11, a RAM (Random Access Memory) 12, a ROM (Read Only Memory) 13, an input/output port (I/O port) 14, and a bus 15 that connects these to one another. Further, the motion detecting device 10 has the form of a semiconductor device in which the above-described structural elements are mounted on a semiconductor substrate.

The CPU 11 governs control of the entire motion detecting device 10. The ROM 13 is a storage medium that stores a motion detecting program 16, that is described later and that is executed by the CPU 11, and order information 17, that expresses the order of setting of a designated axis that is described later. The RAM 12 is a storage medium that provides a work area that temporarily stores data, commands, and the like that are used in computational processing at the CPU 11. The acceleration signals $S_{aX}$, $S_{aY}$ and $S_{aZ}$ of the respective axes that are outputted from the acceleration sensor 20 are supplied to the CPU 11 via the input/output port 14. Further, a motion detection signal $S_d$, that is described later and that is generated due to the CPU 11 executing the motion detecting program 16, is outputted to the exterior via the input/output port 14.

Figure 2:
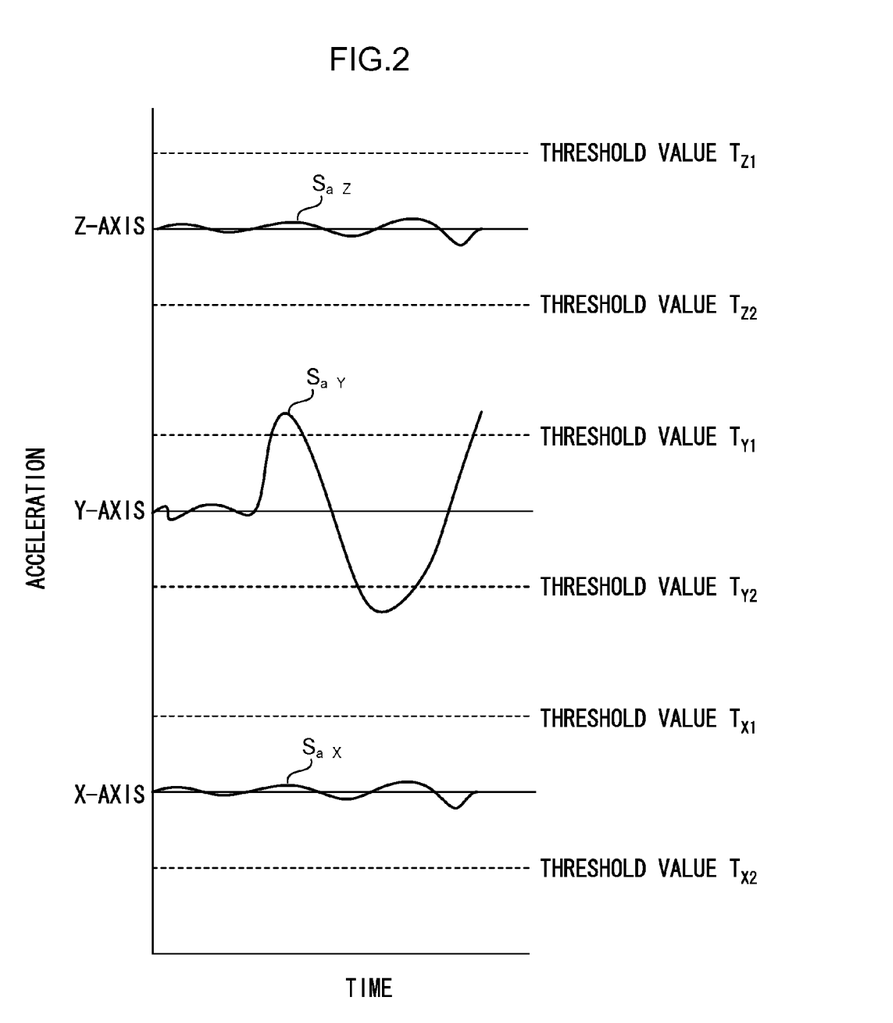
FIG. 2 is a drawing showing an example of an acceleration signal per axis.

FIG. 2 is a drawing showing examples of the acceleration signals $S_{aX}$, $S_{aY}$ and $S_{aZ}$ of the X-axis, the Y-axis and the Z-axis that are outputted from the acceleration sensor 20. In FIG. 2, the horizontal axis is time, and the vertical axis is acceleration. FIG. 2 is an example of a case in which a back-and-forth motion of one time along the Y-axis direction has been generated at the acceleration sensor 20. The generating of motion (acceleration) at the acceleration sensor 20 by applying force from the exterior in this way is called "shaking". For example, when the acceleration sensor 20 is shaken back-and-forth one time along the Y-axis, as shown in FIG. 2, the acceleration sensor outputs the acceleration signal $S_{aY}$ that has peaks at the upper side (the positive side) and the lower side (the negative side). Further, in this case, the acceleration signals $S_{aX}$ and $S_{aZ}$ of the X-axis and Z-axis are substantially zero level. Zero level of an acceleration signal means that motion (acceleration) has not arisen at the acceleration sensor 20, and the positive/negative sign of the acceleration signal indicates a direction of acceleration that runs along that axis.

The motion detecting device 10 judges, for the acceleration signals $S_{aX}$, $S_{aY}$ and $S_{aZ}$ of the respective axes, that motion (shaking) along the corresponding axial direction has been carried out in a case in which the acceleration signal has exceeded both of the set threshold values at the positive side and the negative side within a predetermined time period. For example, in the example shown in FIG. 2, the acceleration signal $S_{aY}$ of the Y-axis exceeds first threshold value $T_{Y1}$ that is set for the positive side, and thereafter, exceeds second threshold value $T_{Y2}$ that is set for the negative side. Therefore, the motion detecting device 10 judges that motion (shaking) in the Y-axis direction has been carried out. Note that exceeding the threshold value that is set for the negative side means that the absolute value of the acceleration in the negative direction is greater than the threshold value that is set for the negative side.

The motion detecting device 10 carries out motion detection as follows by executing the motion detecting program 16. Namely, on the basis of the order information 17 that is set in advance, the motion detecting device 10 sets each of plural axes, that are selected from among the three axes, as the designated axis in a predetermined order. The motion detecting device 10 outputs the motion detection signal $S_d$ when the motion detecting device 10 judges that the directions of motion, that are detected on the basis of the acceleration signals $S_{aX}$, $S_{aY}$ and $S_{aZ}$ of the respective axes that are supplied from the acceleration sensor 20, are directions running respectively along the set designated axes. Namely, the motion detecting device 10 outputs the motion detection signal $S_d$ when the motion detecting device 10 judges that motion (shaking), along the direction of the designated axis that is switched successively, has been carried out with respect to all of the designated axes.

Figure 3:
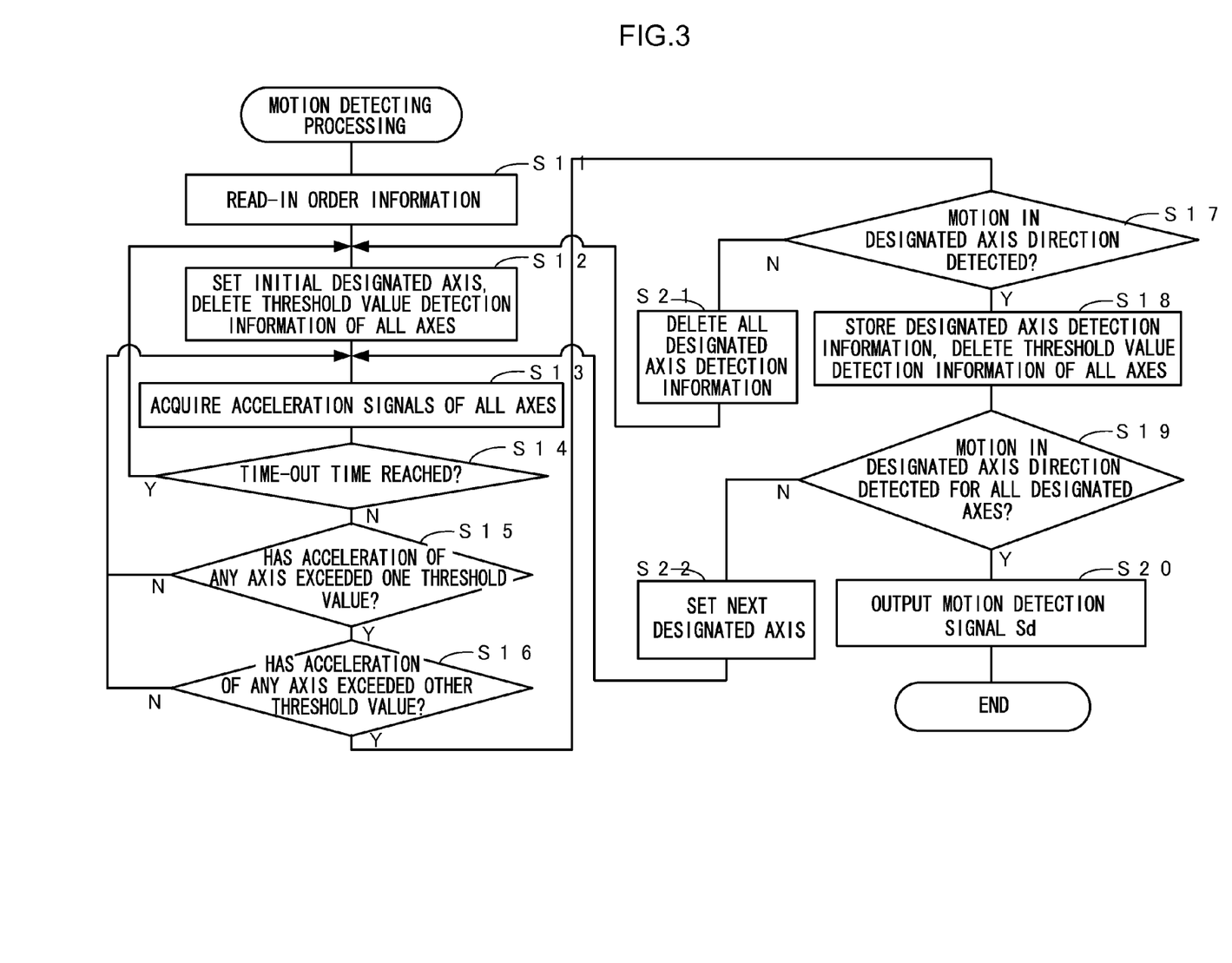
FIG. 3 is a flowchart showing the flow of motion detecting processing relating to an embodiment of the present invention.

FIG. 3 is a flowchart showing the flow of motion detecting processing relating to the first embodiment of the present invention, that is executed due to the CPU 11 of the motion detecting device 10 executing the motion detecting program 16 that is stored in the ROM 13.

Figure 4:
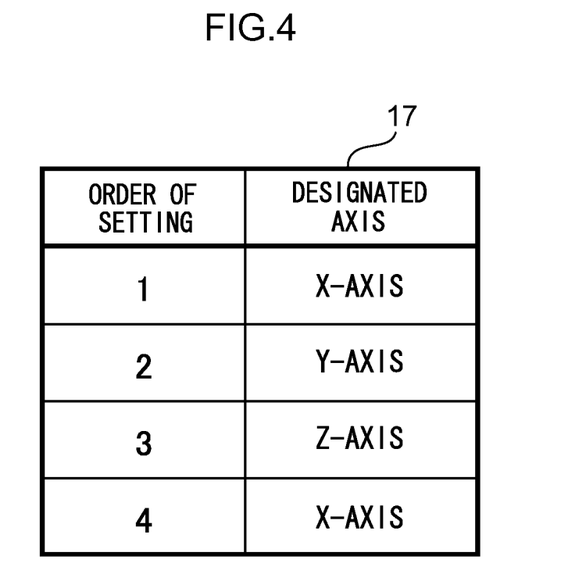
FIG. 4 is a drawing showing an example of the contents of order information relating to the embodiment of the present invention.

In step S11, the CPU 11 reads-in the order information 17 that is stored in the ROM 13 and that expresses the order of setting of the designated axes. The designated axes include at least two axes among the three axes. The order information 17 is information expressing the order of setting of plural designated axes that are selected from among the three axes. FIG. 4 is a drawing showing an example of the contents of the order information 17. In the example shown in FIG. 4, it is shown that the X-axis is made to be the designated axis first, the Y-axis is made to be the designated axis second, the Z-axis is made to be the designated axis third, and the X-axis is made to be the designated axis fourth.

In step S12, on the basis of the order information 17, the CPU 11 sets the first designated axis among the X-axis, the Y-axis and the Z-axis. Further, in present step S12, the CPU 11 deletes threshold value detection information that expresses that the acceleration detection signal has exceeded the first threshold value or the second threshold value, for all of the axes. Namely, step S12 corresponds to a resetting processing.

In step S13, the CPU 11 acquires the acceleration signals $S_{aX}$, $S_{aY}$ and $S_{aZ}$ of the X-axis, the Y-axis and the Z-axis respectively, from the acceleration sensor 20.

In step S14, the CPU 11 judges whether or not the time from the start of the processing of step S13 has exceeded a predetermined time-out time. If the CPU 11 judges that the time-out time has not yet been reached, the CPU 11 moves the processing on to step S15. If the CPU 11 judges that the time-out time has been exceeded, the CPU 11 returns the processing to step S12.

In step S15, the CPU 11 judges whether or not the acceleration of any of the axes has exceeded either one of the first threshold value that is set for the positive side or the second threshold value that is set for the negative side. If the CPU 11 judges that the acceleration of any of the axes has exceeded either one of the threshold values, the CPU 11 generates threshold value detection information and stores this information in the RAM 12, and moves the processing on to step S16. On the other hand, if the CPU 11 judges that none of the accelerations of any of the axes has exceeded either of the first threshold value or second threshold value, the CPU 11 returns the processing to step S13.

In step S16, the CPU 11 judges whether or not the acceleration of an axis, that is the same as the axis whose acceleration was judged in step S15 as having exceeded either one of the first threshold value or the second threshold value, has exceeded the other threshold value among the first threshold value and the second threshold value. For example, if the CPU 11 judged in step S15 that the acceleration of the X-axis exceeded a first threshold value $T_{X1}$ that is set for the positive side, in step S16, the CPU 11 judges whether or not the acceleration of the X-axis has exceeded a second threshold value $T_{X2}$ that is set for the negative side. If the CPU 11 judges that the acceleration of that axis has exceeded that threshold value, the CPU 11 stores threshold value detection information in the RAM 12, and moves the processing on to step S17. On the other hand, if the CPU 11 judges that the acceleration of that axis has not exceeded that threshold value, the CPU 11 returns the processing to step S13.

In step S17, the CPU 11 judges whether or not motion (shaking) in the direction of the designated axis that is currently set has been detected. Namely, if the axis, whose acceleration was judged to have exceeded the first threshold value and the second threshold value in steps S15 and S16, is the designated axis, the CPU 11 judges that motion (shaking) of the designated axis has been detected. For example, in a case in which the X-axis is set as the designated axis, if the CPU 11 detects, in step S15, that the acceleration on the X-axis has exceeded the first threshold value $T_{X1}$ and detects, in step S16, that the acceleration on the X-axis has exceeded the second threshold value $T_{X2}$, the CPU 11 judges, in step S17, that motion (shaking) in the designated axis direction has been detected.

If the CPU 11 judges, in step S17, that motion (shaking) in the direction of the designated axis that is currently set has been detected, the CPU 11 moves the processing on to step S18. On the other hand, if the CPU 11 does not detect motion (shaking) along the direction of the designated axis that is currently set (if the axis of the acceleration that was judged to have exceeded the first threshold value and the second threshold value in steps S15 and S16 is an axis other than the designated axis), the CPU 11 moves the processing on to step S21. For example, in a case in which the X-axis is set as the designated axis, if motion (shaking) in the Y-axis direction is detected, the judgment in step S17 is negative, and the CPU 11 moves the processing on to step S21.

In step S18, the CPU 11 generates designated axis detection information that expresses that motion (shaking) in the direction of the designated axis that is currently set has been detected, and stores this information in the RAM 12, and, for all of the axes, deletes the threshold value detection information that expresses that the acceleration detection signal has exceeded the first threshold value or the second threshold value.

In step S19, the CPU 11 judges whether or not motion (shaking) in the designated axis direction has been detected for all of the designated axes. If the CPU 11 judges that motion (shaking) in the designated axis direction has been detected with respect to all of the designated axes, the CPU 11 moves the processing on to step S20. If the CPU 11 does not judge that motion (shaking) in the designated axis direction has been detected for all of the designated axes, the CPU 11 moves the processing on to step S22.

In step S20, the CPU 11 considers that combined shaking has been established, and generates the motion detection signal $S_d$, and outputs the signal from the input/output port 14, and ends the present routine. Combined shaking means carrying out motion (shaking) in the designated axis direction with respect to all of the designated axes.

In step S21 that is moved on to when the judgment in step S17 is negative, the CPU 11 deletes all of the designated axis detection information that is stored in the RAM 12, and the CPU 11 moves the processing on to step S12. Namely, if motion in the direction of an axis that is different from the direction of the designated axis that is currently set is detected, the motion in the designated axis direction that has been detected up until then is all considered to have not been detected, and the CPU 11 returns the processing to the initial state.

In step S22 that is moved on to when the judgment in step S19 is negative, the CPU 11 sets the next designated axis, and returns the processing to step S13.

Figure 5A:
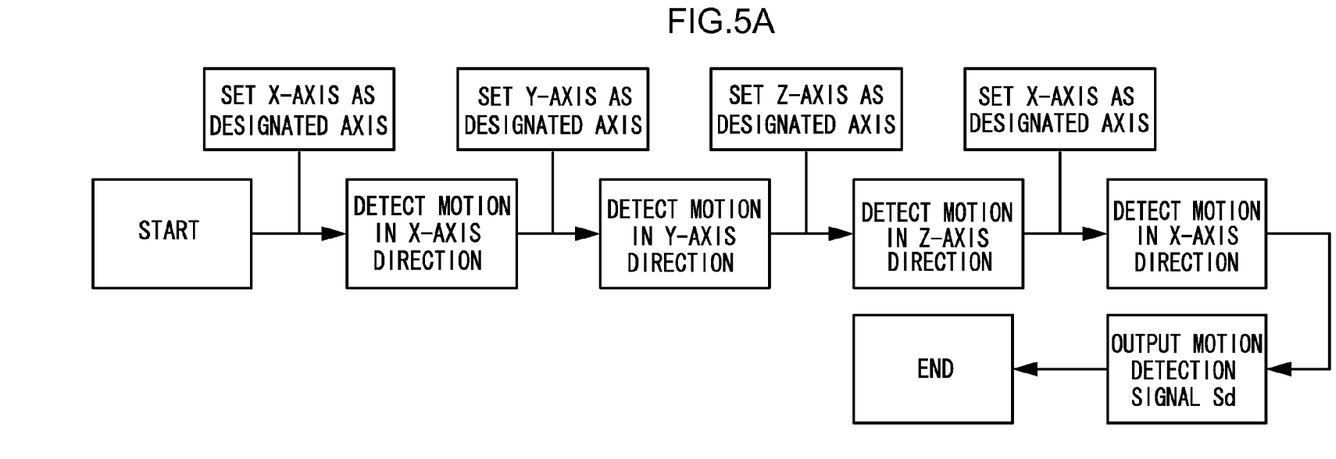
FIG. 5A is a drawing showing an example of operation of the motion detecting device relating to the embodiment of the present invention.
Figure 5B:
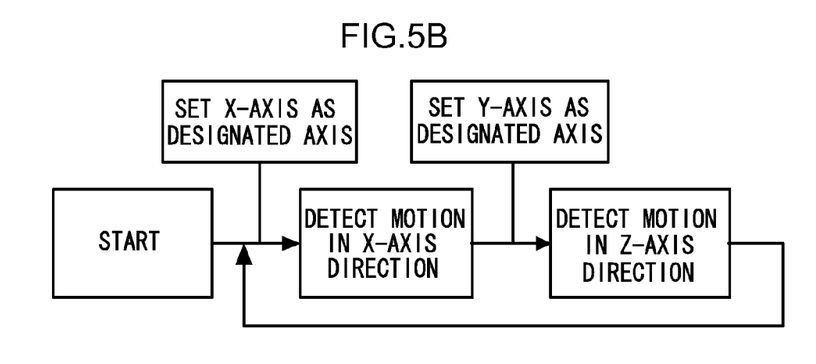
FIG. 5B is a drawing showing an example of operation of the motion detecting device relating to the embodiment of the present invention.

FIG. 5A and FIG. 5B are drawings showing examples of operations of the motion detecting device 10 that carries out the above-described motion detecting processing (see FIG. 3). These are operational examples in cases in which the order of setting of the designated axis is the order of the X-axis, the Y-axis, the Z-axis, the X-axis. The order information 17, that expresses the aforementioned order of setting of the designated axis (the X-axis, the Y-axis, the Z-axis, the X-axis), is stored in the ROM 13, and is read-in by the CPU 11 (step S11).

As shown in FIG. 5A, the motion detecting device 10 first sets the X-axis as the designated axis (step S12). When the motion detecting device 10 detects motion (shaking) in the X-axis direction while the X-axis is set as the designated axis (when the judgment in step S17 is affirmative), the motion detecting device 10 sets the Y-axis as the second designated axis (step S22). When the motion detecting device 10 detects motion (shaking) in the Y-axis direction while the Y-axis is set as the designated axis (when the judgment in step S17 is affirmative), the motion detecting device 10 sets the Z-axis as the third designated axis (step S22). When the motion detecting device 10 detects motion (shaking) in the Z-axis direction while the Z-axis is set as the designated axis (when the judgment in step S17 is affirmative), the motion detecting device 10 sets the X-axis as the fourth designated axis (step S22). When the motion detecting device 10 detects motion (shaking) in the X-axis direction while the X-axis is set as the fourth designated axis (when the judgment in step S19 is affirmative), the motion detecting device 10 considers that combined shaking has been established, and outputs the motion detection signal $S_d$ (step S20). Namely, the motion detection signal $S_d$ is outputted when shaking has been carried out in the order of the X-axis, the Y-axis, the Z-axis, the X-axis.

Further, as shown in FIG. 5B, the motion detecting device 10 first sets the X-axis as the designated axis (step S12). When the motion detecting device 10 detects motion (shaking) in the X-axis direction while the X-axis is set as the designated axis (when the judgment in step S17 is affirmative), the motion detecting device 10 sets the Y-axis as the second designated axis (step S22). When the motion detecting device 10 detects motion (shaking) in the direction of the Z-axis, that is different than the designated axis, while the Y-axis is set as the designated axis (when the judgment in step S17 is negative), the motion detecting device 10 judges that combined shaking has failed, and considers that motion in the designated axis (the X-axis) direction that was detected previously was not detected (step S21), and returns the setting of the designated axis to the first (step S12).

As described above, acceleration signals, that express the accelerations of the respective axes of the three axes of a three-dimensional orthogonal coordinate system, are inputted to the motion detecting device 10 relating to the embodiment of the present invention, and the motion detecting device 10 sets plural axes, that are selected from among the three axes, as the designated axis in a predetermined order. The motion detecting device 10 outputs the motion detection signal $S_d$ when the motion detecting device 10 judges, on the basis of the inputted acceleration signals of the respective axes, that the directions of motions that are detected are directions running along the respective designated axes that have been set.

Namely, the motion detecting device 10 relating to the embodiment of the present invention outputs the motion detection signal $S_d$ when combined shaking, in which motion (shaking) in the designated axis direction is carried out with respect to all of the designated axes, is established. In accordance with such an aspect, motion detection is possible for each axis of a three-dimensional orthogonal coordinate system that includes the gravity axis. Further, because plural axes are set as designated axes, it can be made such that monotonic motion, that arises at the time of walking or at the time of ascending or descending stairs, is not judged to be intentional motion (shaking) due to user operation.

Second Embodiment

Figure 6:
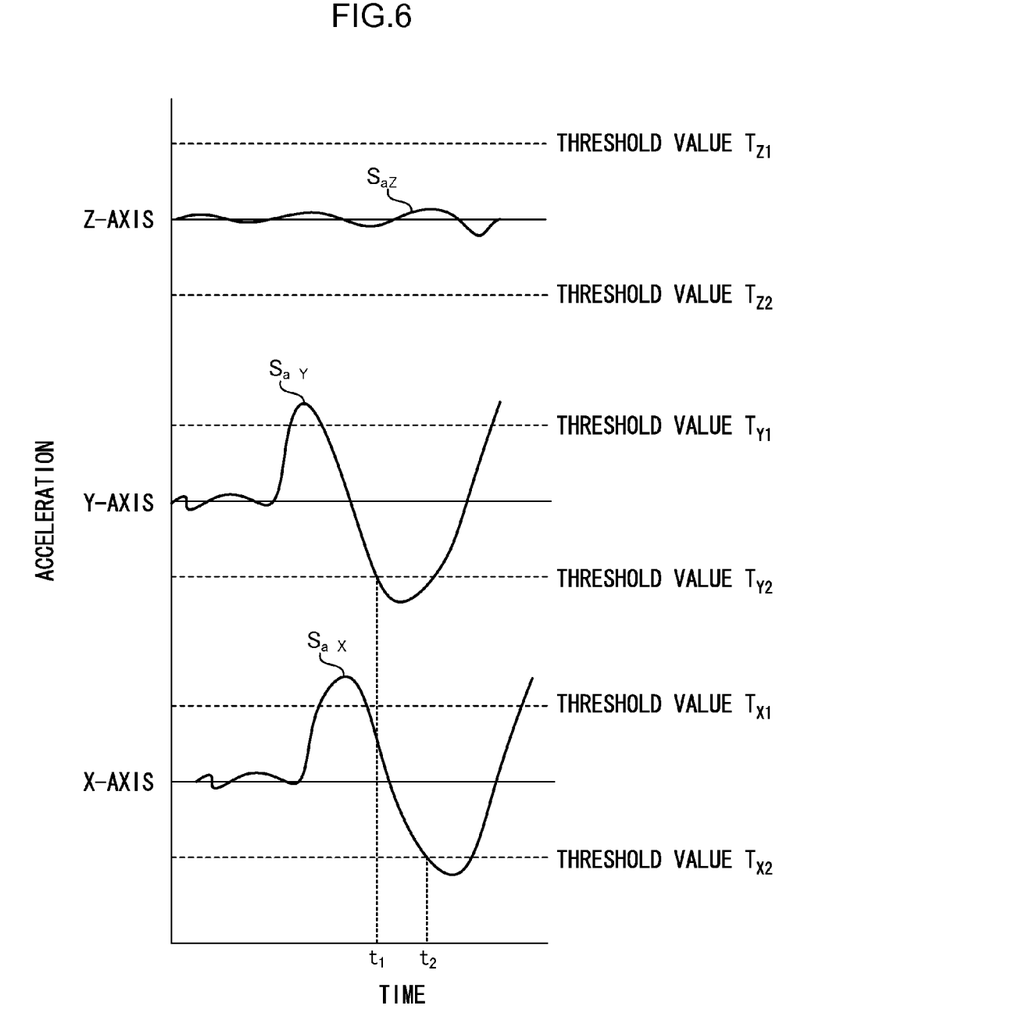
FIG. 6 is a drawing showing examples of acceleration signals in a case in which shaking in oblique direction is carried out.

Even if, for example, the user intends to carry out shaking in the X-axis direction, there are cases in which, in actuality, shaking in an oblique direction that includes both an X-axis direction component and a Y-axis direction component is carried out. FIG. 6 is a drawing showing examples of acceleration signals in a case in which shaking in an oblique direction, that includes both an X-axis direction component and a Y-axis direction component, is carried out with respect to the acceleration sensor 20. When such shaking in an oblique direction is carried out, as shown in FIG. 6, the acceleration signals $S_{aX}$, $S_{aY}$, that have peaks at the upper side (the positive side) and the lower side (the negative side), are outputted at the X-axis and the Y-axis respectively. Even in cases in which shaking in an oblique direction that includes both an X-axis direction component and a Y-axis direction component is carried out, the amplitudes and the phases of the acceleration signals differ from one another at the X-axis and the Y-axis. In the example shown in FIG. 6, a case is illustrated in which the phase of the acceleration signal $S_{aY}$ of the Y-axis is slightly ahead of the phase of the acceleration signal $S_{aX}$ of the X-axis.

When shaking in an oblique direction shown in FIG. 6 is carried out, the motion detecting device 10 detects motion (shaking) in the Y-axis direction at time t1, and thereafter, detects motion (shaking) in the X-axis direction at time t2. Namely, when shaking in an oblique direction shown in FIG. 6 is carried out, motion (shaking) in the Y-axis direction is detected first. Therefore, for example, if the X-axis is set as the designated axis, it will be judged that motion in the direction of an axis other than the designated axis has been detected, and combined shaking will not be established. Accordingly, the user must carry out combined shaking again from the start. In this way, in accordance with the motion detecting device 10 of the first embodiment, the user must carry out shaking correctly along the direction of the designated axis. The motion detecting device 10 relating to the second embodiment differs from the first embodiment with regard to the point that combined shaking can be established even if shaking in an oblique direction is carried out.

Figure 7:
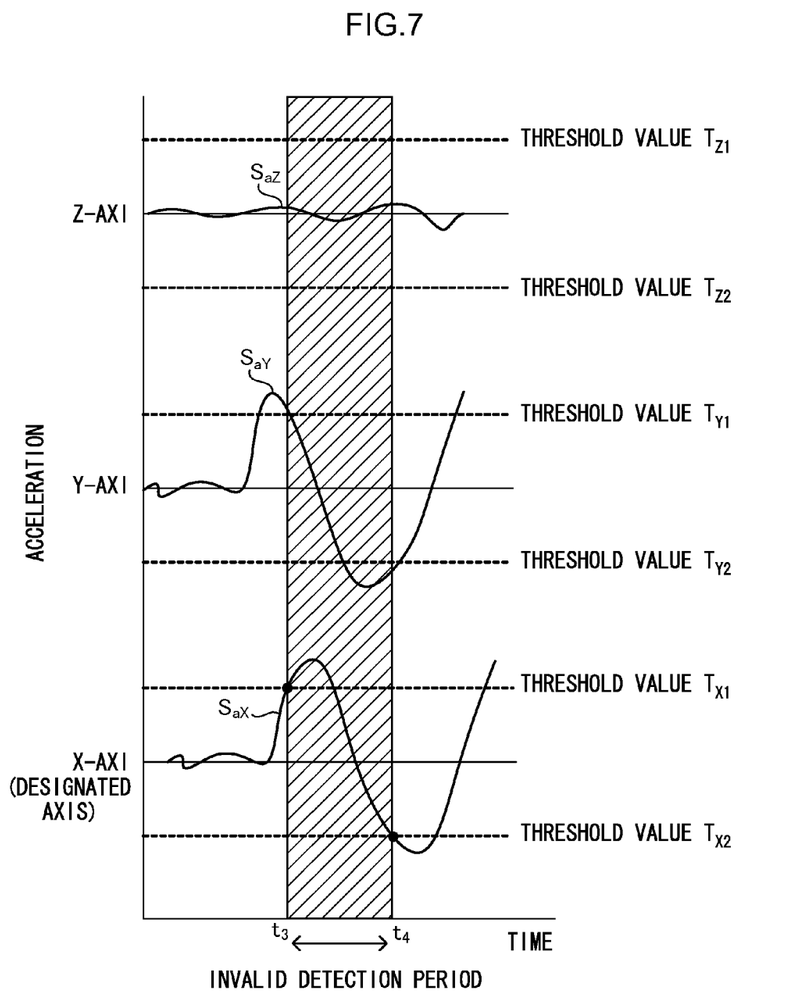
FIG. 7 is a drawing for explaining the contents of the motion detecting processing relating to the embodiment of the present invention.

FIG. 7 is a drawing for explaining the contents of motion detecting processing at the motion detecting device 10 relating to the second embodiment of the present invention. Note that, here, the X-axis is set as the designated axis.

The motion detecting device 10 relating to the second embodiment makes the period of time, from the time that the acceleration signal of the designated axis exceeds either one of the first threshold value or the second threshold value until the time that the acceleration signal exceeds the other, be an invalid detection period in which the detection of motion (shaking) in directions of axes other than the designated axis is invalid. In the example shown in FIG. 7, the period of time, from time t3 when the acceleration signal $S_{aX}$ of the X-axis that is the designated axis exceeds the first threshold value $T_{X1}$ to time t4 when the acceleration signal $S_{aX}$ exceeds the second threshold value $T_{X2}$, is made to be the invalid detection period. In the example shown in FIG. 7, before motion (shaking) in the direction of the X-axis that is the designated axis is detected, the acceleration signal $S_{aY}$ of the Y-axis exceeds the second threshold value $T_{Y2}$, and motion (shaking) in the Y-axis direction is detected before motion (shaking) in the X-axis direction. However, because the time at which the motion (shaking) in the Y-axis direction is detected is within the invalid detection period, the motion (shaking) in the Y-axis direction is treated as not having been detected. In the present embodiment, in order to invalidate the detection of motion (shaking) in the Y-axis direction, threshold value detection information, that expresses that the acceleration signal $S_{aY}$ of the Y-axis has exceeded the first threshold value $T_{Y1}$ and the second threshold value $T_{Y2}$, is deleted from the RAM 12. In this way, when shaking in an oblique direction is carried out, by deleting the detection information of motion in directions of axes other than the designated axis, combined shaking can be established even in cases in which shaking in an oblique direction is carried out.

Note that FIG. 6 and FIG. 7 exemplify a case in which the phase of the acceleration signal $S_{aY}$ of the Y-axis is slightly ahead of the phase of the acceleration signal $S_{aX}$ of the X-axis that is the designated axis, but there are also cases in which the opposite occurs. Namely, there are also cases in which, when shaking in an oblique direction is carried out, motion in the direction of the X-axis that is the designated axis is detected first, and thereafter, motion in the Y-axis direction is detected. In such a case, in accordance with the above-described motion detecting processing (see FIG. 3), when motion in the designated axis direction is detected (the judgment in step S17 is affirmative), the threshold value detection information of all of the axes is deleted (step S18). Therefore, because the motion in the Y-axis direction that is detected after is made invalid, there is no problem.

Figure 8:
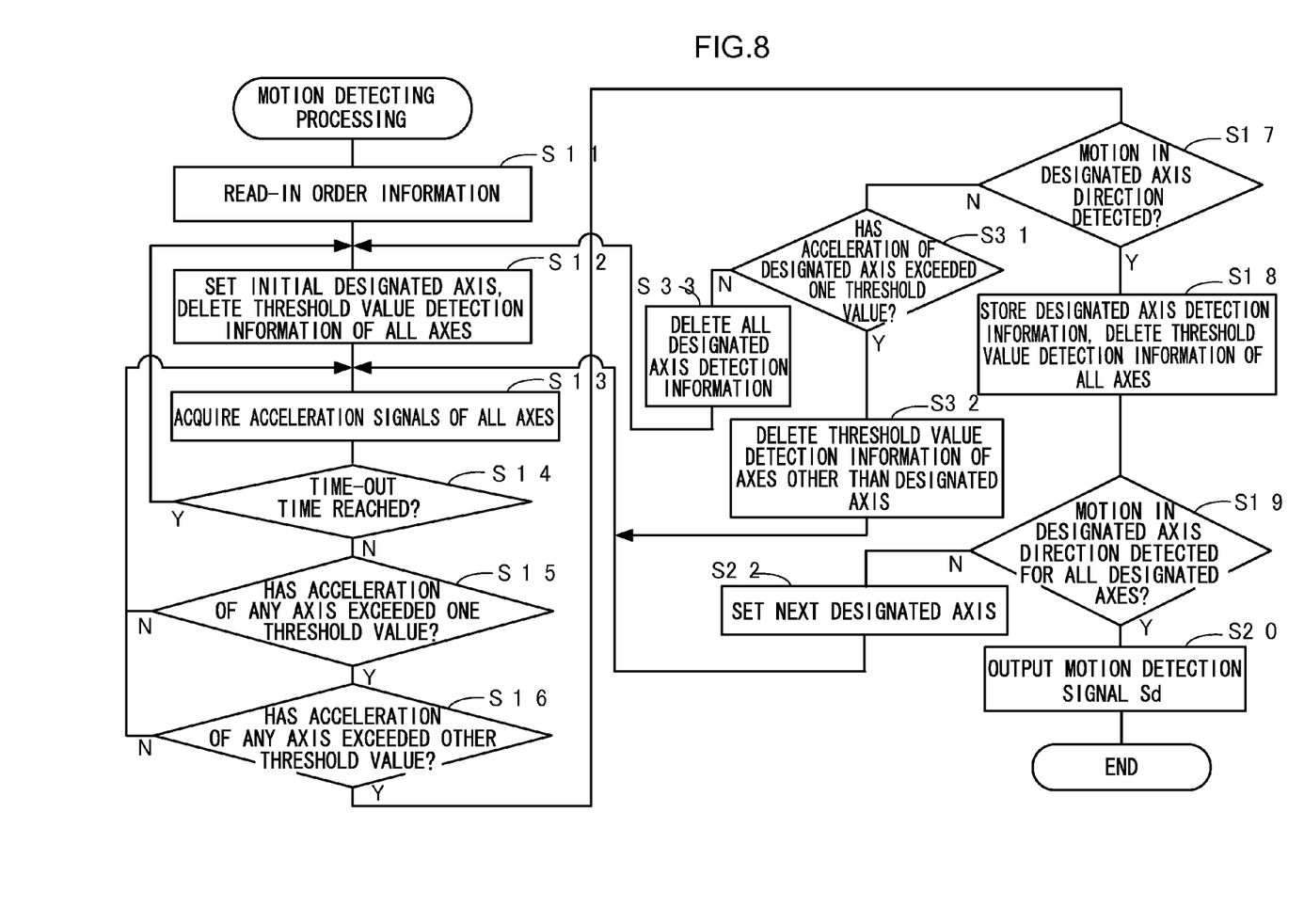
FIG. 8 is a flowchart showing the flow of motion detecting processing relating to an embodiment of the present invention.

FIG. 8 is a flowchart showing the flow of the motion detecting processing relating to the second embodiment of the present invention, that is executed due to the CPU 11 executing the motion detecting program 16 stored in the ROM 13. The processings of steps S11 through S20 and S22 in the motion detecting processing shown in FIG. 8 are similar to the processings of steps S11 through S20 and S22 in the motion detecting processing relating to the first embodiment shown in FIG. 3, and therefore, repeat description is omitted.

In step S17, if motion in the designated axis direction is not detected (if motion in the direction of an axis other than the designated axis is detected), the CPU 11 moves the processing on to step S31. In step S31, the CPU 11 judges whether or not the acceleration on the designated axis has exceeded one of the first threshold value and the second threshold value. Namely, due to this judgment, it is judged whether or not it is within the above-described invalid detection period. This judgment can be carried out on the basis of the threshold value detection information stored in the RAM 12. If the CPU 11 judges that the acceleration on the designated axis has exceeded one of the first threshold value and the second threshold value (i.e., judges that it is within the invalid detection period), the CPU 11 moves the processing on to step S32. On the other hand, if the CPU 11 judges that the acceleration on the designated axis has not exceeded either of the first threshold value or the second threshold value (i.e., judges that it is not within the invalid detection period), the CPU 11 moves the processing on to step S33.

In step S32 (i.e., if it is judged that it is within the invalid detection period), the CPU 11 deletes the threshold value detection information of the axes other than the designated axis that were generated due to affirmative judgments in steps S15 and S16, and returns the processing to step S13. Due to this processing, detection of motion in directions of axes other than the designated axis is rendered invalid.

In step S33 (i.e., if it is judged that it is not within the invalid detection period), the CPU 11 deletes all of the designated axis detection information that is stored in the RAM 12, and moves processing on to step S12. Namely, if motion, that is in a direction that differs from the direction of the designated axis that is currently set, is detected and the acceleration of the designated axis has not exceeded either of the first threshold value or the second threshold value, it is considered that all of the motion in the designated axis direction that has been detected until now has not been detected, and processing is returned to the initial state.

As described above, in accordance with the motion detecting device 10 relating to the second embodiment of the present invention, even if motion (shaking) in an oblique direction such as shown in FIG. 6 is carried out, the detection of motion in directions of axes other than the designated axis is made to be invalid. Accordingly, even when motion (shaking) in an oblique direction is carried out, if a designated axis direction component is included therein, combined shaking can be established. Namely, in accordance with the motion detecting device 10 relating to the second embodiment, because there is no need to carry out correct shaking along the direction of the designated axis, the operability can be improved as compared with the first embodiment.

Third Embodiment

Figure 9:
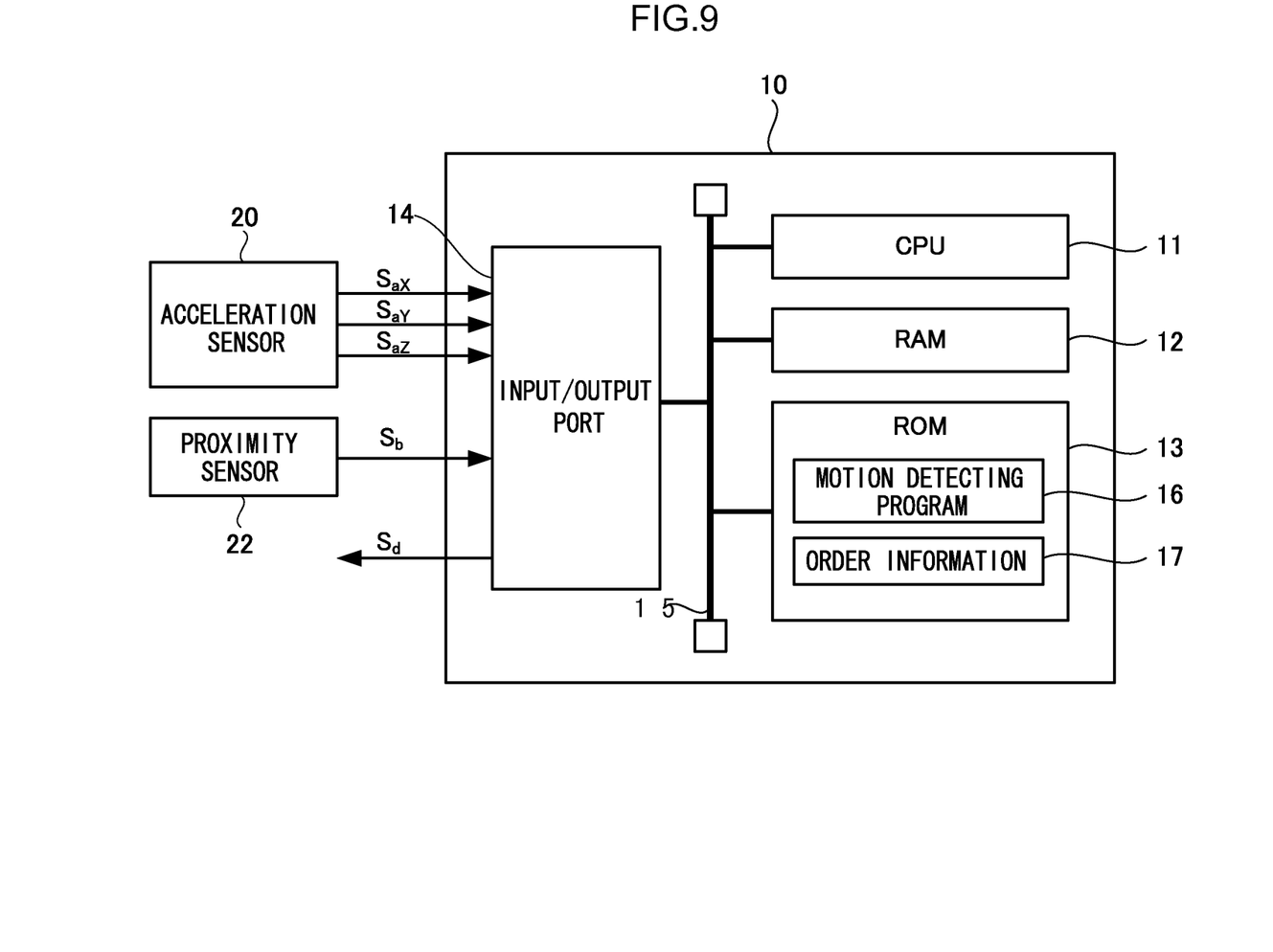
FIG. 9 is a block drawing showing the structure of a motion detecting device relating to an embodiment of the present invention.

FIG. 9 is a block diagram showing the structure of the motion detecting device 10 relating to the third embodiment. At the motion detecting device 10 relating to the third embodiment, in addition to the acceleration signals that are outputted from the acceleration sensor 20, a proximity detection signal $S_b$ that is outputted from a proximity sensor 22 is inputted to the input/output port 14.

Proximity sensors utilizing various types of methods are known, but an infrared-ray-type approximation sensor can be suitably used as the proximity sensor 22 relating to the present embodiment. The proximity sensor 22 is structured to include light-emitting elements that emit infrared rays, and light-receiving elements that convert the received light into electric signals. When the infrared rays that are emitted from the light-emitting elements are illuminated onto an object, the infrared rays are reflected, and are received by the light-receiving elements and converted into electric power. When the converted electric power is greater than or equal to a given level, the proximity sensor 22 judges that an object is within a given distance, and outputs the proximity detection signal $S_b$.

By using the proximity sensor 22, the electronic device (e.g., a portable terminal device 50 that is described later), in which the acceleration sensor 20 and the proximity sensor 22 and the motion outputting device 10 are mounted, can detect a state of being within a bag or within a pocket. Namely, when the proximity detection signal $S_b$ is outputted from the proximity sensor 22, it is not state in which the user is holding the electronic device in his/her hand, and, in this case, it can be assumed that the user is not carrying out shaking intentionally. The motion detecting device 10 relating to the third embodiment executes the motion detecting processing relating to the above-described first embodiment or second embodiment, and, when combined shaking is established, outputs the motion detection signal $S_d$, but, when the proximity detection signal $S_b$ is being outputted from the proximity sensor 22, does not output the motion detection signal $S_d$. In this way, by making it such that the motion detection signal $S_d$ it not outputted while the proximity detection signal $S_b$ is being outputted, erroneous judgment due to motion that the user has not intended can be prevented more effectively.

EXAMPLES

Figure 10:
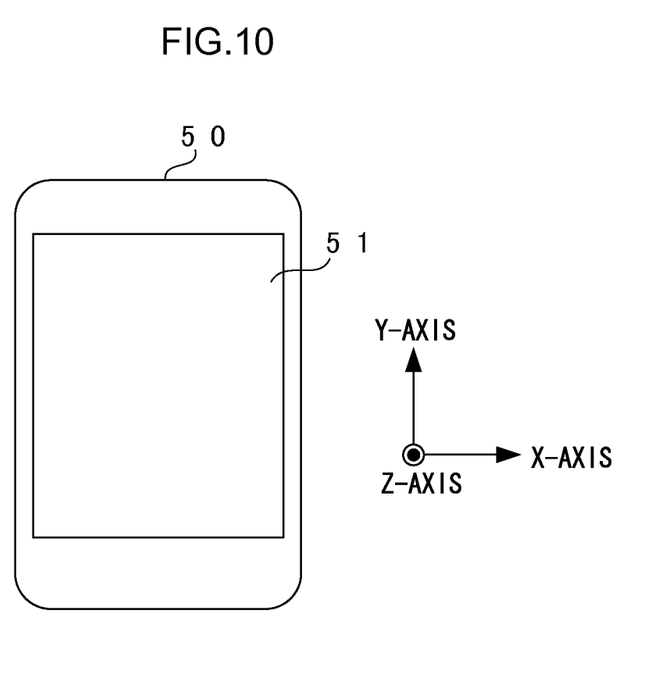
FIG. 10 is a top view of a portable terminal device relating to an embodiment of the present invention.

FIG. 10 is a top view of the portable terminal device 50 that relates to an embodiment of the present invention and in which the motion detecting device 10, relating to any of the above-described respective embodiments, and the acceleration sensor 20 are incorporated. The portable terminal device 50 may be a portable communication terminal device such as a cell phone or a smart phone.

A display screen 51 is provided at the center of the top surface of the portable terminal device 50. The acceleration sensor 20 (not shown in FIG. 7) is mounted within the portable terminal device 50 such that the X-axis corresponds to the left-right direction of the display screen 51, the Y-axis corresponds to the top-bottom direction of the display screen 51, and the Z-axis corresponds to the front-back direction of the display screen 51.

Figure 11:
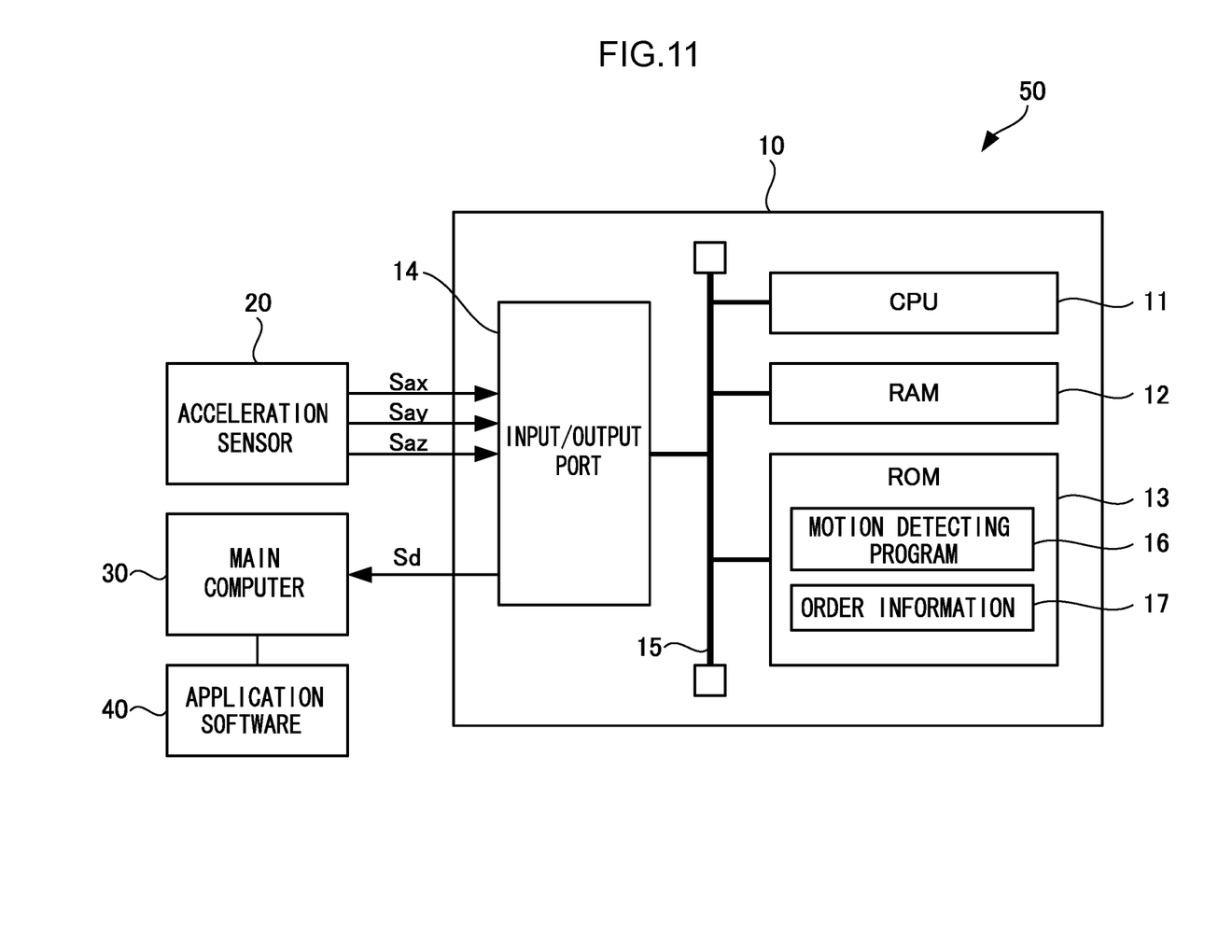
FIG. 11 is a block drawing showing the structure of the portable terminal device relating to the embodiment of the present invention.

FIG. 11 is a block diagram showing the structure of the portable terminal device 50. The portable terminal device 50 is structured to include the acceleration sensor 20, the motion detecting device 10, a main computer 30, and application software 40. Note that, as in the above-described third embodiment, the proximity sensor 22 can also be applied.

The main computer 30 is a computer that governs the control of the entire portable terminal device 50, and is structured to include an unillustrated CPU, RAM and ROM. The main computer 30 is structured by a semiconductor integrated circuit whose circuit scale is larger than the motion detecting device 10 that is structured by a microcomputer. Note that the main computer 30 corresponds to the control section of the portable terminal device relating to the present invention.

The main computer 30 is connected to the input/output port 14 of the motion detecting device 10. The motion detection signal $S_d$, that is outputted from the input/output port 14, is supplied to the main computer 30. The application software 40 is installed in the main computer 30. As an example, the application software 40 may be software that provides functions for sending/receiving and browsing and the like email. As another example, the application software 40 may be software that provides the function of generating audio data.

When the main computer 30 receives the motion detection signal $S_d$ from the motion detecting device 10, the main computer 30 carries out predetermined operations. As an example, when the main computer 30 receives the motion detection signal $S_d$ from the motion detecting device 10, the main computer 30 may start-up the application software 40. As another example, when the main computer 30 receives the motion detection signal $S_d$ from the motion detecting device 10, the main computer 30 may cause functions provided by the application software 40 to be exhibited. For example, in a case in which the application software 40 is software that provides functions for sending/receiving and browsing and the like email, the main computer 30 may carry out sending of email in accordance with the motion detection signal $S_d$.

In this way, in accordance with the portable terminal device 50 relating to the embodiment of the present invention in which the acceleration sensor 20 and the motion detecting device 10 are incorporated, the portable terminal device 50 can be operated by shaking Because the motion detection signal $S_d$ is outputted only when combined shaking is established, unintentional operation being carried out due to monotonic motion arising when walking or when ascending and descending stairs can be prevented.

Here, if the main computer 30 is made to carry out the motion detecting processing executed by the motion detecting device 10, the main computer 30 always monitors the acceleration signals from the acceleration sensor 20. The main computer 30 is structured from a semiconductor integrated circuit of a relatively large circuit scale, and, if operated always, the amount of electric power that is consumed increases and the battery consumption increases. In accordance with the portable terminal device 50 relating to the present embodiment, the motion detecting device 10, that is structured by a microcomputer whose circuit scale is smaller than the main computer 30, carries out the motion detecting processing, and therefore, the amount of electric power that is consumed can be decreased as compared with a case in which the main computer 30 carries out the motion detecting processing.

Although embodiments of the present invention have been described above, the present invention is not limited to the above-described respective embodiments, and can be changed in various ways. The above-described respective embodiments exemplify cases in which the order information 17 that expresses the order of setting the designated axis is stored in the ROM 13. However, there may be a structure in which the order information 17 can be rewritten appropriately. Further, the motion detecting device 10 may be structured so as to prescribe plural types of combined shaking, and to output the motion detection signal $S_d$ that corresponds to each type of combined shaking. For example, the motion detecting device 10 may output a first motion detection signal $S_{d1}$ when a first combined shaking is established, and output a second motion detection signal $S_{d2}$ when a second combined shaking is established. In this case, the portable terminal device 50 may carry out a first operation in accordance with the first motion detection signal $S_{d1}$, and carry out a second operation in accordance with the second motion detection signal $S_{d2}$. Further, the motion detecting device 10 may be formed as a module that is structured integrally with the acceleration sensor 20.

Embodiments of the present invention are described above, but the present invention is not limited to the embodiments as will be clear to those skilled in the art.

What is claimed is:

1. A motion detecting device comprising:
an input section to which acceleration signals, that express accelerations of respective axes of three axes of a three-dimensional orthogonal coordinate system, are respectively inputted; and
a motion detecting section configured to set each of plural axes, that include two different axes that are selected from among the three axes, as a plurality of designated axes in a predetermined order, and output a motion detection signal upon judgment that directions of motion, that are detected on a basis of the acceleration signals of the respective axes that were inputted to the input section, are directions of respective designated axes that have been set,
wherein upon detection that an acceleration signal of an axis has reached both a first threshold value that is set for a positive side and a second threshold value that is set for a negative side, the motion detecting section is configured to detect that motion in a direction of the axis has been carried out,
upon judgment that a direction of motion, that is detected on a basis of the acceleration signals of the respective axes that were inputted to the input section, is a direction of the designated axis that has been set, the motion detecting section is configured to generate designated axis detection information and store the designated axis detection information, and
upon judgment that a direction of motion, that is detected on a basis of the acceleration signals of the respective axes that were inputted to the input section, is a direction that differs from the direction of the plurality of designated axes that has been set, the motion detecting section is configured to delete the designated axis detection information, and return setting of the designated axis to an initial state.

2. The motion detecting device of claim 1, wherein, when the motion detecting section detects motion in a direction of an axis other than the plurality of designated axes during a period from the acceleration signal of the designated axis exceeding either one of the first threshold value or the second threshold value to the acceleration signal of the designated axis exceeding another of the first threshold value or the second threshold value, the motion detecting section is configured to invalidate detection of the motion on the axis other than the plurality of designated axes.

3. The motion detecting device of claim 1, wherein:
a proximity detection signal, that expresses that an object is close to the motion detecting device, is further inputted to the input section, and
upon detection, on a basis of the proximity detection signal, that an object is close to the motion detecting device, the motion detecting section is configured to not output the motion detection signal.

4. A portable terminal device comprising:
the motion detecting device of claim 1;
an acceleration sensor configured to input the respective acceleration signals to the input section; and
a control section configured to carry out a predetermined operation in accordance with the motion detection signal.

5. The portable terminal device of claim 4, wherein, when the motion detecting section detects motion in a direction of an axis other than the plurality of designated axes during a period from the acceleration signal of the designated axis exceeding either one of the first threshold value or the second threshold value to the acceleration signal of the designated axis exceeding another of the first threshold value or the second threshold value, the motion detecting section is configured to invalidate detection of the motion on the axis other than the plurality of designated axes.

6. The portable terminal device of claim 4, wherein:
a proximity detection signal, that expresses that an object is close to the motion detecting device, is further inputted to the input section, and
upon detection, on a basis of the proximity detection signal, that an object is close to the motion detecting device, the motion detecting section is configured to not output the motion detection signal.

7. A motion detecting method comprising:
setting each of plural axes, that are selected from among three axes of a three-dimensional orthogonal coordinate system, as a plurality of designated axes in a predetermined order; and
outputting a motion detection signal upon judgment that directions of motion, that are detected on the basis of received acceleration signals that express accelerations of the respective axes of the three axes, are directions of respective designated axes that have been set,
wherein upon detection that an acceleration signal of an axis has reached both a first threshold value that is set for a positive side and a second threshold value that is set for a negative side, detecting that motion in the direction of the axis has been carried out,
upon judgment that a direction of motion, that is detected on a basis of the received acceleration signals of the respective axes, is a direction of the designated axis that has been set, generating designated axis detection information and storing the designated axis detection information, and
upon judgment that a direction of motion, that is detected on a basis of the received acceleration signals of the respective axes, is a direction that differs from the direction of the plurality of designated axes that has been set, deleting the designated axis detection information, and returning setting of the designated axis to an initial state.

8. The motion detecting device of claim 1, further comprising:
a storage section configured to store order information that indicates an order of setting of the plurality of designated axes,
wherein the motion detection section is configured to detect sequentially whether or not the acceleration signals of the respective designated axes exceed a threshold value in an order indicated in the order information.

* * * * *